United States Patent [19]

Karnaugh et al.

[11] 3,851,252

[45] Nov. 26, 1974

[54] TIMING RECOVERY IN A DIGITALLY IMPLEMENTED DATA RECEIVER

[75] Inventors: Maurice Karnaugh, Yorktown Heights, N.Y.; Gerald Kevin McAuliffe, Dublin, Ireland

[73] Assignee: International Business Machines Corporation, Armonk, N.Y.

[22] Filed: Dec. 29, 1972

[21] Appl. No.: 319,129

[52] U.S. Cl. .............. 325/321, 178/88, 179/15 BA, 179/15 BS

[51] Int. Cl. .............................................. H04b 1/16

[58] Field of Search.......... 325/42, 321; 178/69.5 R, 178/88, 50; 235/152; 179/15 BA, 15 BS, 15 BV

[56] References Cited

UNITED STATES PATENTS

| | | | |
|---|---|---|---|
| 3,484,591 | 12/1969 | Trimble | 235/152 |
| 3,522,546 | 8/1970 | Jackson et al. | 235/152 |
| 3,535,450 | 10/1970 | Vollmeyer | 178/50 |
| 3,588,718 | 6/1971 | Oiso | 325/321 |
| 3,651,316 | 3/1972 | Gibson | 325/42 X |
| 3,668,315 | 6/1972 | Heitzman | 178/69.5 R |
| 3,742,360 | 6/1973 | Ragsdale | 325/42 |
| 3,746,800 | 7/1973 | Stuart | 178/69.5 R |
| 3,755,736 | 8/1973 | Kaneko et al. | 325/42 |
| 3,757,296 | 9/1973 | Gibson | 325/42 X |

*Primary Examiner*—Robert L. Griffin
*Assistant Examiner*—Aristotelis M. Psitos
*Attorney, Agent, or Firm*—Charles P. Boberg

[57] ABSTRACT

Pulse amplitude modulated (PAM) receiver in which timing errors are corrected without requiring that the signal sampling operations of the receiver be synchronized with those of the transmitter. The invention is applicable particularly to multichannel PAM systems in which a common analog-digital converter receives inputs from a plurality of channels serving independently timed transmitters. The inputs to the converter are supplied by a commutator which samples the incoming channels rapidly enough to obtain several samples per signal pulse. From these samples is determined the extent to which the pulse peak lags or leads a particular one of the sampling times. By passing the digitized samples through an interpolating filter whose coefficients are selected according to the estimated timing error, the system enables digital codes representing the peak values of the sampled pulses to be emitted in synchronism with the successive closures of an output sampling gate for the respective channel.

11 Claims, 8 Drawing Figures

DATA CLOCK OUT OF PHASE WITH MOD.4 SAMPLING COUNT

DATA CLOCK SLOWER THAN MOD. 4 SAMPLING COUNT

DATA CLOCK FASTER THAN MOD. 4 SAMPLING COUNT

ALL-PASS FILTER (DIRECT REALIZATION)

ALL—PASS FILTER
(FACTORED FORM)

TIMING RECOVERY IN A DIGITALLY IMPLEMENTED DATA RECEIVER

BACKGROUND OF THE INVENTION

1. Field of the Invention

The invention relates generally to pulse amplitude modulated (PAM) receivers in which the incoming amplitude-modulated analog data signals are sampled and converted to digitally coded signals for convenient processing, and it relates in particular to the problem of recovering correct sample timing where the sampling clock at the receiver necessarily must operate independently of the data clock at the transmitter and cannot have its timing readjusted.

2. Description of the Prior ARt

It is customary to adjust the timing of the signal sampling operation at the receiver of a PAM receiver so that it is synchronous with the signal pulse generating operation at the transmitter. Where there is only a single communication line or channel per sampling gate at the receiver, this does not present a problem. However, in situations where it is necessary to sample many independent lines or channels in time multiplex through a common device at the receiver, the problem of recovering timing errors under such conditions usually is regarded as quite severe. A situation of this kind may arise, for instance, if it should be desired to provide only one analog-to-digital (A/D) converter for many incoming lines, instead of providing an individual A/D converter for each line. To insure that the common A/D converter does not receive its sample inputs in too rapid a sequence, the respective lines must be sampled through a commutator whose timing cannot be varied, regardless of any variations in the timing of the data clocks at the respective transmitters. The correction of timing discrepancies and small frequency discrepancies between the sampling operations at the receiver and the data clocks at the respective transmitters under these conditions, using conventional methods, would be prohibitively expensive or impossible. On the other hand, the acceptance of unsynchronized signal samples would increase the likelihood of noise distortion to an intolerable extent.

SUMMARY OF THE INVENTION

A prime object of the present invention is to enable a PAM receiver to yield synchronized outputs from a multiplicity of independent inputs, any number of which may be unsynchronized with respect to each other and with respect to the sampling operations of the receiver.

A further object is to utilize a digital processor for the recovery of timing errors in a PAM system which receives multiple unsynchronized inputs through a common analog-to-digital converter.

In accordance with an important feature of the invention, a time-shared digital processor is utilized to provide for each input line a simulated set of digital filters having graduated delay intervals, any one of which may be dynamically selected as an effective signal path through the receiver. Before entering the processor, the incoming signal is sampled at a rate which is a multiple (or substantially a multiple) of the origial data clock rate at the transmitter. The sampled signal is analyzed by a timing error estimation process and is passed through an appropriate one of the simulated digital filters so that when it emerges therefrom, it will be synchronized with a count-down sampling gate which emits output signals at an average rate equal to that of the data clock at the transmitter. The filter coefficients are selected according to the extent, if any, to which the interpolated peak of each signal pulse is out of phase with the output sampling action of the receiver (as determined by the timing error estimation process), so that the filter will interpose the proper delay to maintain proper timing at the receiver output. The filter selection process is continually updated, and the filter coefficients are automatically changed when necessary. The conditioning of a filter to operate with new coefficients is begun well in advance of the time when such a filter actually will be needed.

The foregoing and other objects, features and advantages of the invention will be apparent from the following more particular description of the preferred embodiments of the invention as illustrated in the accompanying drawings.

DESCRIPTION OF THE PREFERRED EMBODIMENTS

Figures 1, 1A:
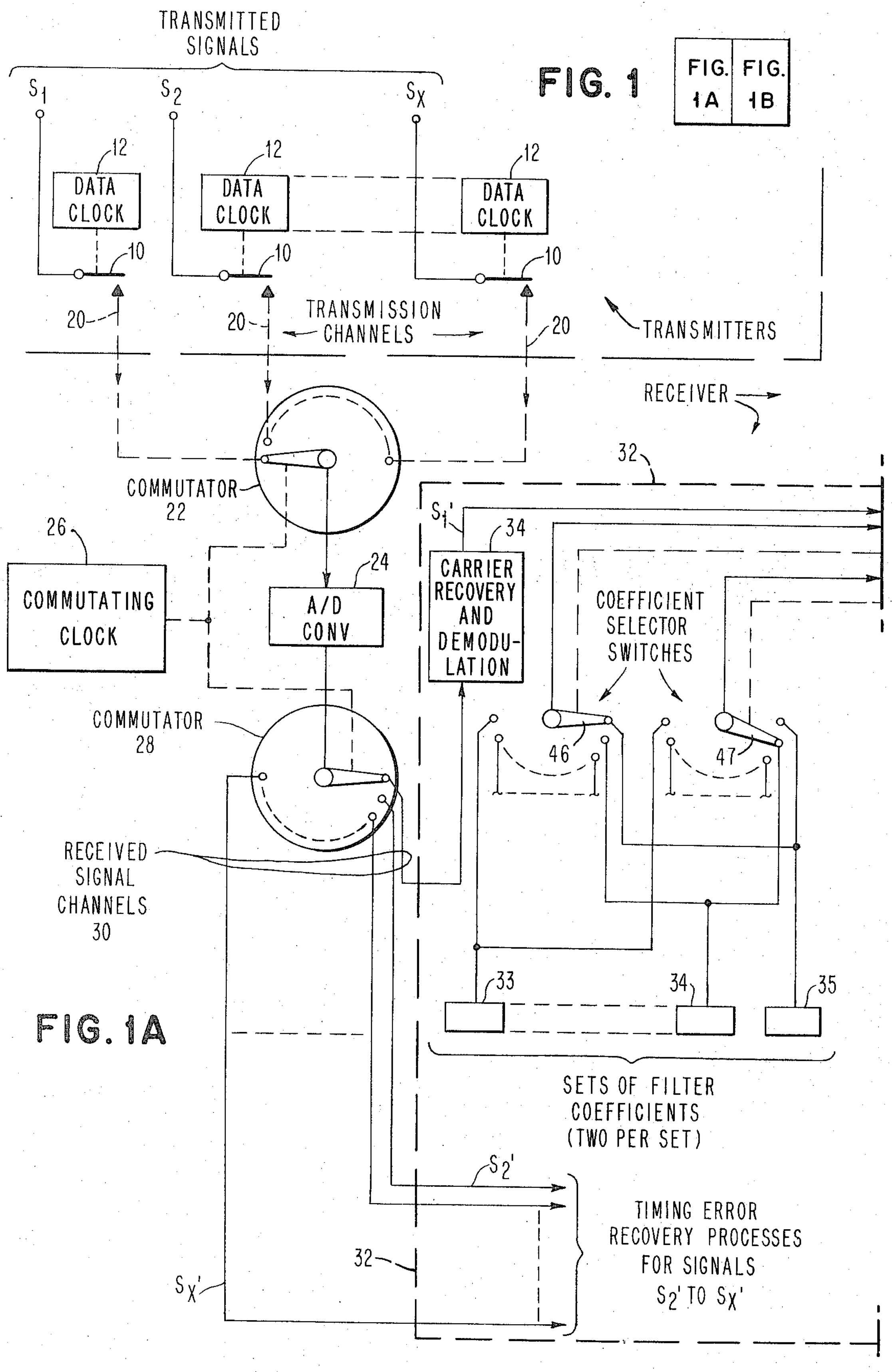
FIGS. 1A and 1B, when arranged according to FIG. 1, together constitute a diagramatic representation of a PAM digital communication system which functions in accordance with the principle of the invention.
Figure 1B:
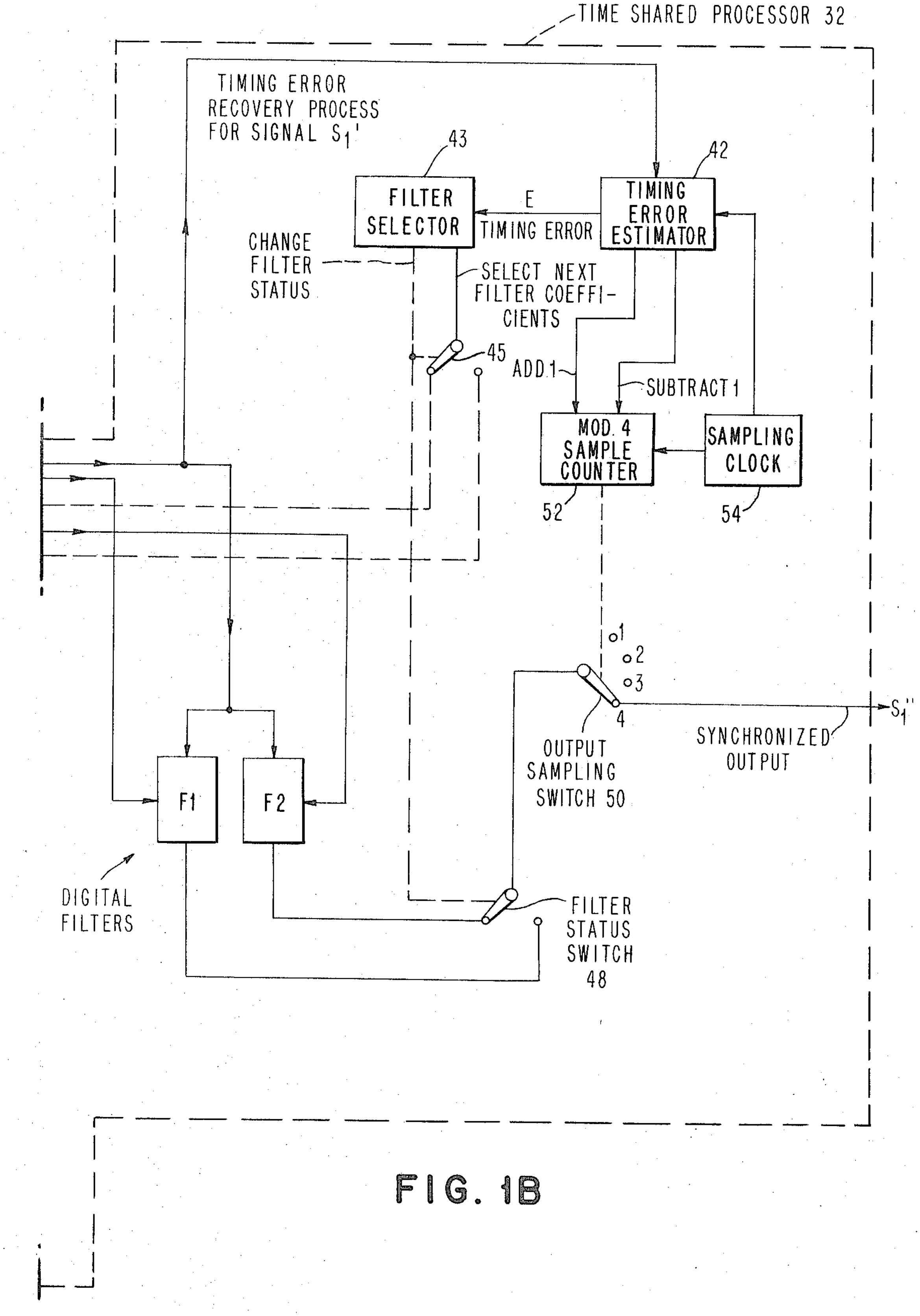

FIGS. 1A and 1B represent in a schematic fashion a PAM system wherein the various analog input pulse sequences $S_1$, $S_2$...$S_x$ are transmitted at their respective transmitters by means of sampling gates 10 driven respectively by data clocks 12. These gates 10 operate independently of each other but at approximately the same sampling rate. By way of example, it will be assumed that the data clocks 12 operate at a nominal sampling rate of 2,400 pulses per second.

However, as just indicated, these clocks are not required to be in phase with each other, and in general they will have only random phase relationships with one another. Moreover, any data clock 12 may be subject to some slight frequency deviation which will cause the timing of its transmitted pulses to drift slowly in one sense or the other relative to an assumed standard clock timing.

Each time a sampling gate 10 closes and opens, it generates a pulse having an amplitude proportional to the magnitude of the sampled signal at the instant when sampling occurs. The pulses thus generated are utilized to produce appropriate amplitude modulations of a carrier wave, the means for accomplishing this not being shown. The amplitude-modulated carriers from the various PAM tramsmitters are sent through various lines or channels 20 to a common PAM receiver which collects information from all of these sources. Aspects of this receiver which are familiar to persons skilled in the art will not be disclosed herein, attention being given only to those features of the receiver which are provided by the present invention.

The PAM signals received through the channels 20 are fed through a commutating switch or input sampling gate 22 to a common A/D converter 24. The commutator 22 samples each of the lines 20 in turn. It is driven by a commutating clock 26 at a frequency such that each line 20 is sampled at a rate which is a preselected multiple of the nominal sampling rate at the transmitter, and which is not less than twice the bandwidth of the transmitted signal. For example, if each transmitting data clock 12 causes the sampling gate 10 to close at the nominal rate of 2400 times per second, then the commutator 22 at the receiving end of the channel is designed to sample each of the channels 20 at a rate four times as great, or 9,600 times per second. This example will be adhered to during the remainder of the description. Hence, if there are, say, ten channels 20 coming into the commutator 22, then the sampling rate of clock 26 will be 96,000 times per second for all 10 channels. The converter 24 is designed to accept amplitude-modulated input pulses at the rate of 96,000 per second.

The commutator 22 maintains a uniform time spacing between signal samples fed to the converter 24. Thereby it prevents signals passing through different channels from being applied simultaneously to the converter. The output of the converter 24 is applied through a second commutating switch 28, driven by or concurrently with the clock 26, to the input channels 30 of the time shared digital processor 32. One such channel 30 is allocated to each of the input channels or lines 20 coming from the various transmitters. The output of the converter 24 in each instance is a digitally coded signal which represents the corresponding amplitude-modulated signal that was fed into this converter. Each input pulse sample may be represented, for example, by a ten-bit or twelve-bit output code which is capable of being processed by the digital processor 32. Thus, digitally coded signals such as $S_1'$ now represent what formerly were analog input signals such as $S_1$, there being substantially four digital codes in signal $S_1'$ for each data pulse from signals $S_1$.

The commutators 22 and 28 are here represented as separate hardware units which function to distribute the coded output signals of the converter 24 to the channels 30 in synchronism with the application of PAM signals through the lines 20 to said converter. In practice, however, facilities such as commutator 28 may be provided internally by the time shared processor 32. No detailed showing of the time sharing controls is considered necessary, such controls being familiar to persons skilled in the art.

From this point on, the description will be directed specifically to the manner in which the processor 32 handles a particular digitized input signal such as $S_1'$ received through one of the channels 30 and the common A/D converter 24. In this description it will be convenient to refer to the processor 32 as though it were an assemblage of discrete hardware units. This is not meant to limit the invention to such an implementation, however. In practice it may be found convenient to employ a general purpose computer which is programmed to perform the designated functions in a time shared mode.

When the signal $S_1'$ enters the time shared processor 32, the processor recovers the carrier frequency and phase from the signal $S_1'$ and synchronously demodulates the signal in order to restore the data-carrying baseband pulses as indicated at 34, FIG. 1A. The precise methods used for carrier recovery and demodulation will depend upon the form of modulation employed at the transmitter (e.g., double sideband, double sideband suppressed carrier, vestigial sideband, single sideband, double sideband quadrature, etc.). Such methods are already well known. (Reference is made, for example, to *Data Transmission*, by W. R. Bennet and J. R. Davey, McGraw-Hill Publishing Co., New York, 1965.) While most prior art is concerned with analog filtering and processing of signals, it is also well known that equivalent filtering and processing can be performed on digital samples in a digital processor. Accordingly, no special hardware not heretofore available is required to demodulate the signal $S_1'$.

It is assumed that the various samplings of signal $S_1$ which are effected by the commutators 22 and 28 have an out-of-phase relation to the original samplings of the signal $S_1$ by the sampling gate 10 at the transmitter. This is the usual case. It would only rarely happen that a pulse in one of the channels 20 is so timed that it reaches its peak at the exact instant when the commutating switch 22 is sampling that particular line, and it would be even more rare for this to occur during a preselected one of the four samplings which take place for each pulse transmitted through the respective channel 20. (It will be recalled that in accordance with the chosen example, four samplings of each channel 20 by the switch 22 are assumed to occur for each sampling of the corresponding input signal by the respective gate 10. This number is selected for illustrative purposes only). Therefore, the digital codes produced by converter 24 in response to the sampling of a channel 20 by switch 22 will not, in general, include a code representing the peak value of a pulse transmitted through the respective channel 20.

Figure 2:
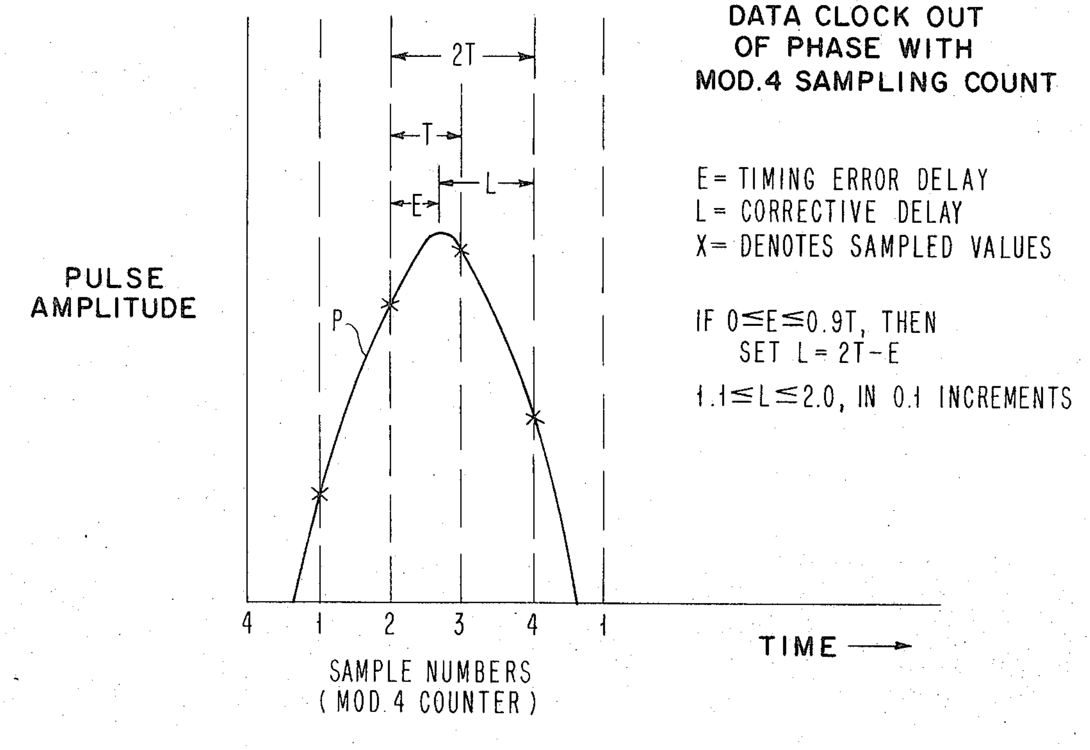
FIGS. 2, 3 and 4 are graphs which depict the operation of the system under various conditions.

In the presently illustrated system it usually is necessary to determine the time at which a pulse peak occurs by interpolating among a set of four digital values which lie on the graph of this pulse at equally spaced time intervals (i.e., the sampling periods). Referring to FIG. 2, for instance, the pulse P (whose amplitude measures the signal value sampled at a corresponding instant by the respective gate 10, FIG. 1A) will be represented in a digital form by four digital encodings which correspond respectively to the values denoted by the sampling points marked "X" on the magnitude-versus-time function or graph of the pulse P. Consecutive numbers 1 to 4 are (as a rule) assigned to the respective times at which these sampling measurements are made, and this same number sequence may be used also to identify the samples themselves.

In the present embodiment it is assumed that the time at which each sample No. 2 is taken will serve as a reference for determining the magnitude of the timing error E of the pulse P. If pulse P attains its peak value subsequent to sampling time 2, the error E represents the delay of the pulse peak relative to sampling time 2, and such a delay is regarded herein as having a positive value. If the pulse peak leads or precedes the sampling time 2 (as in FIG. 4, for example), the timing error then is considered to have a negative value. The numbers assigned to the various sampling times are directly related to the current switching state of a 4-position stepping switch 50, FIG. 1B, which serves as an output sampling switch for the processor 32. In most cases the switch 50 is stepped at regular intervals through its four positions or stages. Under certain conditions (to be described hereinafter) the count maintained by the stepping switch 50 may be instantaneously increased or decreased by 1, thereby either causing one of the sampling numbers in the current series to be temporarily omitted or else causing two sampling times to be temporarily identified by the same number. The significance of these variations in sample numbering will be explained at greater length hereinafter. They derive from the fact that the digital codes appearing in the synchronized output signal $S_1''$ are produced only during those intervals when switch 50 is in its No. 4 counting state, and in certain instances it becomes necessary to vary the time at which the switch attains this state (as will be described later in connection with FIGS. 3 and 4).

Referring again to FIG. 2, which depicts a typical timing error recovery situation, the pulse P (represented in reality by digital codes corresponding to the four sampled pulse magnitude values denoted by X's in FIG. 2) has a peak which is delayed by a time interval E with respect to sampling time No. 2. It will be assumed herein that the error correction process functions in such fashion that the absolute value of E never exceeds T, the time interval between successive samples. In the present instance (referring to FIG. 2) it is assumed that E is a delay whose value is in the range $0 \leq E \leq 0.9T$, the reason for such limits becoming apparent presently. This is the usual situation. The difference between 2T and E, herein designated L, is the amount of additional delay that must be imparted to the pulse P in order that its peak value will reach the output sampling switch 50 when that switch attains its No. 4 counting state. In the present description it will be assumed for simplicity that this is the total amount of delay that must be provided by the system in order to achieve synchronization.

The system now must perform certain functions. First, it must estimate the time at which pulse P attains its peak (since the peak value was not one of the sampled values) and determine the timing error E. Then it must ascertain this peak value by interpolation, and finally, it must delay the passage of the digital code representing the peak value through the receiver by a sufficient amount to insure its synchronism with respect to the modulo-4 sample count as described above. The manner in which these functions are performed now will be explained with reference to FIGS. 1A and 1B.

The functions of delaying the digitized pulse samples on their way to the output sampling switch 50 and finding the peak value of each pulse by interpolation are performed by digital filters F1 and F2, which are alternately selected in accordance with signal conditions that will be described presently. The internal design of such filters will be described subsequently. A filter becomes effective to pass signals when it is rendered active by a two-position status switch 48, which likewise will be described later. As shown in FIG. 1B, filter F2 currently is active. Its alternate, filter F1, is capable of passing signals and producing an output in response to the same signal samples, but its output does not become utilized until switch 48 is reversed. The filter selected by switch 48 will be designated herein as the "current filter," and the other filter as the "next filter." At present F2 is the current filter and F1 the next filter.

Each filter F1 or F2 is supplied with certain coefficients from stores such as 33, 34 and 35, FIG. 1A, each containing a set of coefficients. In the present embodiment each set comprises a pair of coefficients. The manner of selecting these coefficients is determined by the operating conditions of the system. In response to the digitized signal samples which it receives, each filter F1 or F2 generates a train of incrementally changing, digitized, output values. Th only one of these coded values which is of ultimate significance is the one that is generated at the instant when the stepping switch 50, FIG. 1B, is in its No. 4 position. The switch 50 is so arranged in relation to the switch 48 that the output of the "current filter" will pass successively through the switches 48 and 50 to the output line whenever switch 50 attains its No. 4 position. If the filter is functioning properly, this particular output code will substantially represent the peak value of a pulse which was produced by closure of the sampling switch 10 at the transmitting end of the respective channel 20, FIG. 1A. Thus, the filter acts both as a delay line and an interpolator. The output signal $S_1''$ will be made up of coded peak values properly synchronized so that they can be detected without undue distortion.

The digital all-pass filters F1 and F2 are designed in accordance with well-known principles. (Reference is made, for example, to *Digital Processing of Signals*, by B. Gold and C. M. Rader, McGraw-Hill Publishing Co., New York, 1969.) Each filter has a substantially flat amplitude response and linear phase with respect to all frequencies from zero to an acceptable upper frequency. The response function of such a filter is expressed mathematically by the following equation:

$$F(z) = (A_2 + A_1 z^{-1} + z^{-2}) / (1 + A_1 z^{-1} + A_2 z^{-2}),$$

where $z = exp(ST)$ is the usual $z$-transform variable, and multiplication by $z^{-1}$ represents a delay of $T$ seconds.

Figure 5:
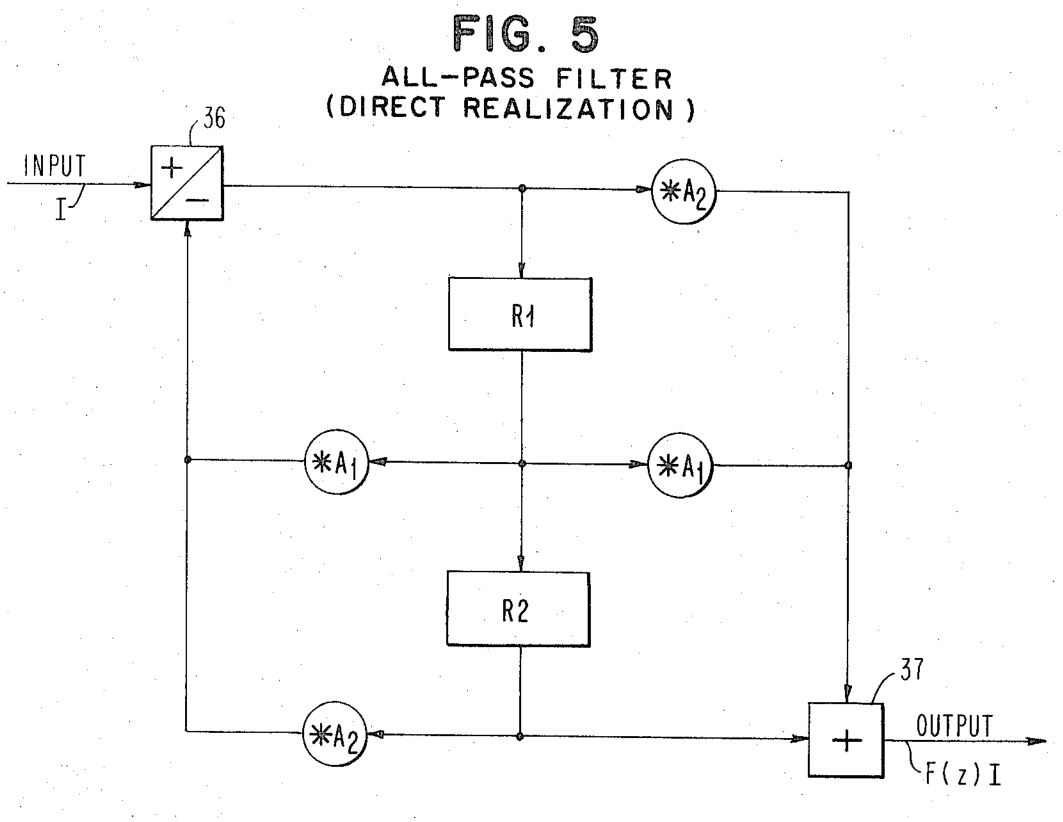
FIG. 5 is a logic diagram which shows one way to provide the type of digital filter that is needed in the system of FIG. 1.

A direct realization of such a filter, using the coefficients $A_1$ and $A_2$ as multipliers, is shown in FIG. 5. R1 and R2 are successive stages of a two-stage shift register. The output of R1, multiplied by $A_1$, is fed back to an inverter-adder 36 at the input of the filter and is applied also to an adder 37 at the filter output. The output of R2 is applied directly to adder 37, and it is also multiplied by $A_2$ and fed back to inverter-adder 36. The output of unit 36 is supplied to R1, and it also is multiplied by $A_2$ and applied to adder 37, the output of which is F(z)I.

Figure 6:
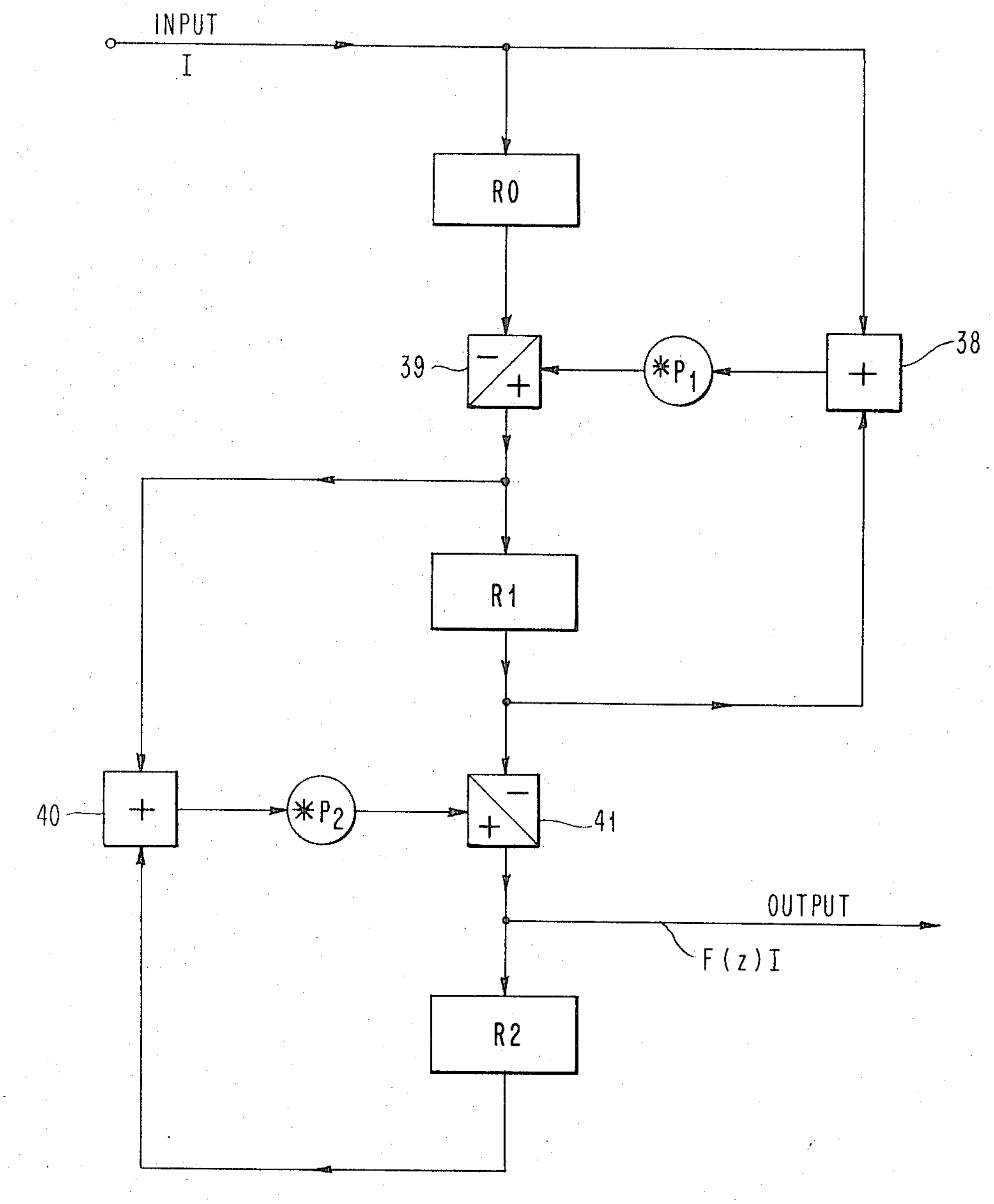
FIG. 6 is a logic diagram showing an alternative form of such a filter.

An equivalent factored form of filter design is shown in FIG. 6. The coefficients $p_1$ and $p_2$ in this instance are the poles of F(z), defined as above, and which will be real-valued. The input I is applied to parallel to adder 38 and to the first stage R0 of a three-stage shift register. Adder 38 also receives the output of the second register stage R1. Its combined output, multiplied by $p_1$, is fed to the inverter-adder 39, which subtracts the contents of R0 from it and feeds the difference in parallel to R1 and to an adder 40, which also receives the output of the third register stage R2. The output of adder 40, multiplied by $p_2$, is fed to the inverter-adder 41, which subtracts from it the output of R1 and supplies the difference to R2 and to the output side of the filter. This form of filter design uses more register stages but requires fewer multiplications than the form shown in FIG. 5. It is expressed mathematically by the following equation:

$$F(z) = (p_1 - z^{-1})/(1 - p_1 z^{-1}) \cdot (p_2 - z^{-1})/(1 - p_2 z^{-1}).$$

The filter functions may, of course, be performed as mathematical processes within the processor 32. The values of the coefficients $A_1$ and $A_2$ may be determined by specifying an upper frequency in radians per second, $\omega_0$, and the ratio of delay error to maximum interpolator delay (i.e., E/2T in the example chosen in FIG. 2) which is of present interest. Letting this ratio E/2T be represented by $\delta$, the value of $A_2$ is determined from the following equation:

$$C_2 A_2{}^2 + C_1 A_2 + C_0 = 0,$$

where:

$$C_2 = (2 - \delta)\ (3 - 2\delta)\ (1 - \cos \omega_0 T)$$

$$C_1 = -2\delta(2 - \delta) - 2(1 - 4\delta + 2\delta^2)\cos \omega_0 T + 2(1 - \delta)^2 \cos 2\omega_0 T$$

$$C_0 = -\delta(1 - 2\delta)\ (1 - \cos \omega_0 T)$$

Having determined $A_2$, $A_1$ now may be determined from the equation:

$$(1 - \delta)\ A_1 = \delta - (2 - \delta)\ A_2$$

This equation is obtained by setting the delay of the filter equal to $2T - E$ at zero frequency. The quadratic equation, above, is obtained by setting the delay of the filter equal to $2T - E$ at radian frequency $\omega_0$. These two conditions are sufficient to determine the two filter coefficients, $A_1$ and $A_2$. Between $\omega = 0$ and $\omega = \omega_0$, and slightly beyond $\omega = \omega_0$, the delay of the filter will deviate slightly from the desired value; but this deviation has been computed and has been found to be sufficiently small for the case being considered. The adequacy of the filter design depends upnon a judicious choice of $\omega_0$ and upon having a high enough sampling rate, $1/T$, relative to the bandwidth of the signal to be delayed.

the poles $p_1$ and $p_2$ are determined in well-known fashion from the resulting expression for F(z) when the calculated values of $A_1$ and $A_2$ are substituted therein.

In practice it has been found satisfactory to design the filters with the pulse delay value E graduated in increments of 0.1T from 0 to 0.9T, whereby the delay $L$ effected by the interpolator (i.e., filter F1 or F2) will be graduated in increments of 0.1T from 1.1T to 2.0T, as noted in FIG. 2. The stores such as 33, 34 and 35, FIG. 1A, contain sets of coefficients $A_1$, $A_2$ or $p_1$, $p_2$, depending upon the type of filter (FIG. 5 or FIG. 6), in accordance with the table below. Ten such pairs of values are assumed to be available in the present example. The insertion of each such pair of values into the interpolation process depicted by FIG. 5 or FIG. 6 provides a filter having the desired interpolation delay L.

In the table below there is set forth a list of values for $A_1$, $A_2$, $p_1$ and $p_2$ under conditions where the interpolator delay L, FIG. 2, has a maximum value 2T, and the error E varies from 0 to 0.9T in 0.1T increments. In each instance the delay L is the difference between 2T and E, ignoring the hundredths and lower orders of E.

| E Pulse Delay | L Interpolator Delay | $A_1$ | $A_2$ | $p_1, p_2$ Pole Positions |
|---|---|---|---|---|
| 0 | 2T | 0 | 0 | 0,0 |
| 0.1T | 1.9T | 0.07649 | −0.01163 | −0.1527,0.07616 |
| 0.2T | 1.8T | 0.1563 | −0.02142 | −0.2441,0.08777 |
| 0.3T | 1.7T | 0.2401 | −0.02924 | −0.320,0.0888 |
| 0.4T | 1.6T | 0.3284 | −0.03485 | −0.4128,0.08442 |
| 0.5T | 1.5T | 0.422 | −0.3798 | −0.4982,0.07624 |
| 0.6T | 1.4T | 0.5215 | −0.03826 | −0.5867,0.06552 |
| 0.7T | 1.3T | 0.6279 | −0.03525 | −0.6798,0.05185 |
| 0.8T | 1.2T | 0.7423 | −0.02837 | −0.7788,0.03643 |
| 0.9T | 1.1T | 0.8659 | −0.1692 | −0.885,0.01912 |

In accordance with the invention, the selection of the appropriate filter coefficients is performed automatically in response to a timing error estimation process. Referring to FIG. 1B, the digitized signal samples applied to the filters F1 and F2 also are applied to a timing error estimator 42, which computes a value of E, FIG. 2, from each set of four successive sample values fed to it. Methods for the ascertainment of timing errors from signal values are known. One such method is described in an article entitled "Timing Recovery in PAM System," by R. D. Gitlin and J. Salz, *Bell Systems Technical Journal*, Vol. 50, May-June 1971, pp. 1645-1669. Essentially, such a method determines the points at which the derivative of the signal waveform passes through zero.

In conventional practice the timing error E found by the estimator 42 would be supplied to a phase adjuster in a modem or like device to adjust the timing of an input sampling gate for reducing the error to zero. Since the timing of the input sampling gate 22, FIG. 1A, is fixed in the present system, however, the computed timing error E is used in a different way to achieve the same end. In the present instance E is fed as input to a filter selector 43, FIG. 1B, which performs several functions in response thereto. If the current value of E differs materially from the value of E which next preceded it, which is to say, that if the value of E changes from one decimal increment of T to an adjacent decimal increment of T, then the selector 43 issues a "change filter status" signal. Among other things, this causes the above-mentioned filter status switch 48 to reverse its position, with the consequence that the digital filter F1 or F2 that previously was inactive (i.e., disconnected from the output gate 50) now becomes active (connected to gate 50), and vice versa. The "change filter status" signal also reverses the position of a two-position selector switch 45. The switches 45 and 48 may be viewed as symbolic representations of selection processes that can be performed by the internal functioning of the processor 32, or alternatively, as actual circuit elements in the case of a hard-wired embodiment. sentation of a selection process that can be performed by Through switch 45 the filter selector 43 alternately effects the positioning of selector switches 46 and 47 (symbolically represented in FIG. 1A) which address the coefficient stores 33, 34, etc. in accordance with their respective settings. The filter F1 is supplied with coefficients whose values depend upon the setting of switch 46. The filter F2 is supplied with coefficients whose values are determined by the setting of switch 47. Either switch 46 or 47 may address any of the coefficient stores, but none of the stores will be addressed by both switches at the same time. Either of these switches 46 and 47 may be set by selector 43 under control of the switch 45. Under conditions as depicted in FIG. 1B, the currently active filter is F2 in this instance, and it receives its coefficients in accordance with the setting of switch 47. The "next" filter is F1 in this case, and it receives its coefficients in accordance with the setting of switch 46. When the filter status changes (that is, when the error E undergoes its next incremental change), the "next" filter becomes the "current" filter, as switches 48 and 45 reverse, and the former "current" filter now becomes the "next" filter. The new current filter already will have been operating with its present coefficients for some time before being designated as the current filter.

The reason for making a second filter available on a standby basis as the "next" filter is that a certain length of time is required for a filter to achieve reliable operation after its coefficients have been changed. Usually the timing error E changes slowly enough so that the next incremental value which it assumes can be predicted well in advance (e.g., by noting when it passes through a full incremental value). This allows opportunity for the system to start the "next filter" process going during the transition to each new "current filter" process; and each new current filter process is merely a continuation of a filter process that already had been in progress as a standby operation. Such procedure insures that there will be no hiatus in the effective control of timing errors by the system.

Reference has been made hereinabove to the output sampling switch 50. This switch is controlled by a modulo-4 counter 52 driven by a sampling clock 54, which furnishes clock pulses at the quadruple frequency of the signal sampling operation. The broken-line connection between counter 52 and switch 50, FIG. 1B, symbolically represents the stepping of switch 50 (which actually may be a counting ring or its software equivalent) in response to counting pulses emitted by counter 52, said counting pulses being synchronous with the clock pulses emitted by clock 54 except under certain conditions that shortly will be described. Normally the counter 52 causes switch 50 to step progressively through positions 1 to 4 in each counting cycle. Occasionally, however, it becomes desirable to alter the count.

Figure 3:
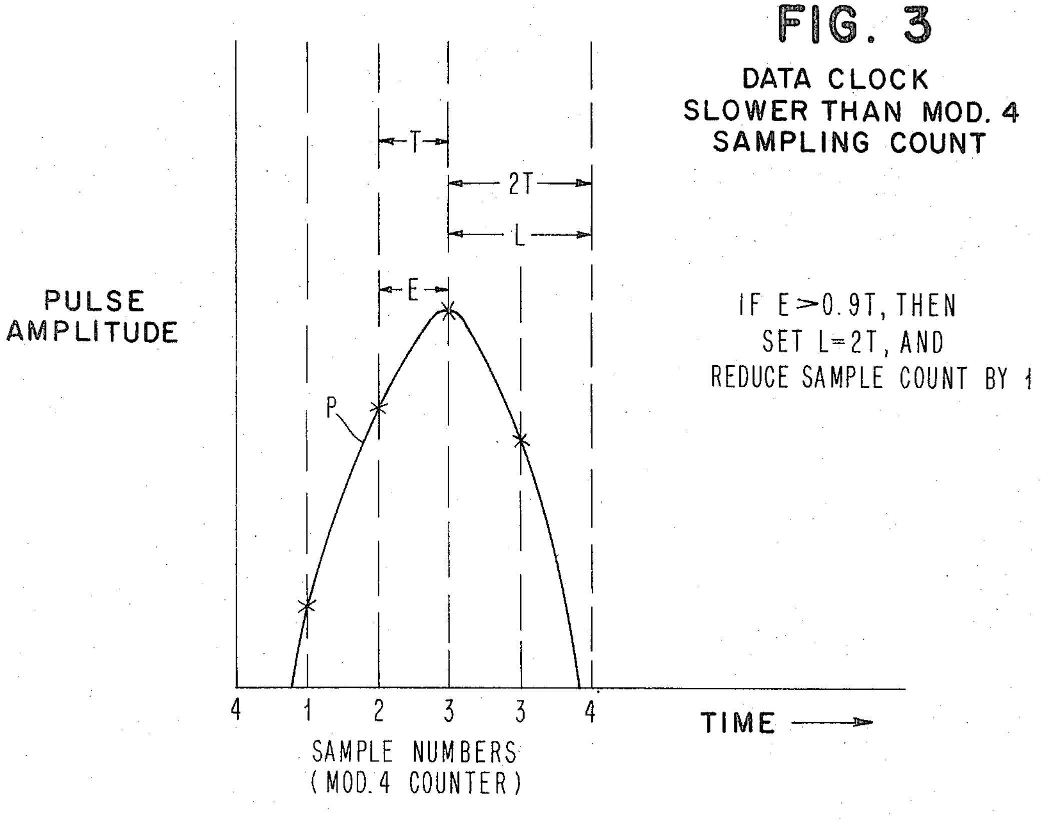

For instance, referring to FIG. 3, assume that the data clock at the transmitter is running a little more slowly than the sampling clock 54 at the receiver. Eventually the timing error E can be expected to exceed the maximum value for which correction can be made merely by selecting different filter coefficients. In the present implementation the available values of the interpolator delay L range from 2.0T down to 1.1T. If E is changing in a manner such that it eventually will exceed 0.9T and attain the value of T, some procedure other than picking the next lower value of L will have to be employed in order to correct such a situation. To take care of this problem, the filter selector 43 causes the next filter coefficients to be chosen so that delay L is made equal to 2.0T, this change becoming effective when the timing error E exceeds 0.95T. The timing error estimator 42, upon detecting that E has exceeded 0.95T, emits a "subtract 1" signal to the modulo-4 counter 52, thereby reducing its count by 1. This extends by one interval T the time which it takes for the stepping switch 50 to reach its No. 4 setting. thus, as shown in FIG. 3, it now takes five counts instead the customary four to generate a synchronized output code in this cycle. Such adjustment is necessary in order to accommodate the new value of L, which has been suddenly increased to 2T. The condition is only temporary, and the usual modulo-4 count is resumed following this corrective action.

Following an adjustment of the sample count as just described, the No. 2 sampling time will occur one interval later than it otherwise would in the succeeding cycle. This will bring it substantially into phase with the pulse peak, so that the timing error now is zero. The interpolator delay L, being now equal to 2T, causes the delayed peak value code to emerge from the filter in phase with the attainment of No. 4 setting by switch 50.

Figure 4:
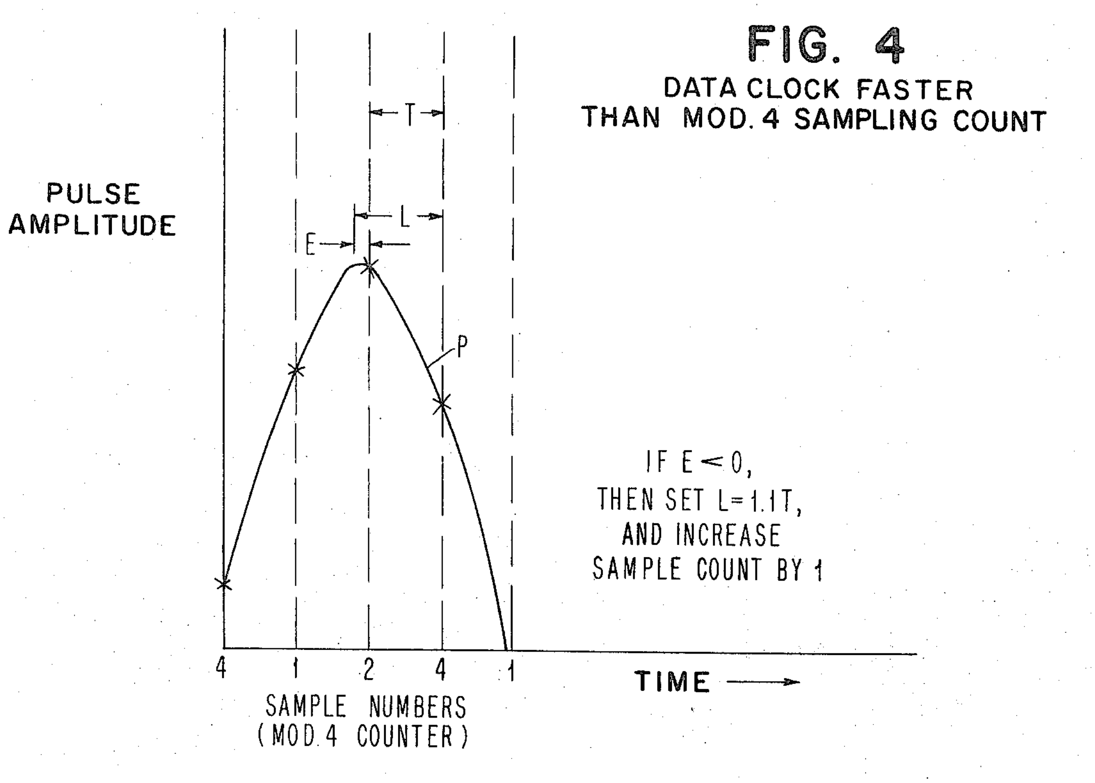

If the data clock at the transmitter is running slightly faster than the sampling clock at the receiver, the timing error E becomes progressively smaller and eventually will start to assume negative values (i.e., pulse peak occurs earlier than No. 2 sample time). Such a condition is depicted in FIG. 4. Since the maximum value of L that can be chosen is 2T, timing correction can no longer be accomplished merely by selecting different filter coefficients. The solution in this instance is to choose the next set of coefficients such that L will have its minimum value of 1.1T. Then at the instant when the next filter becomes the current filter, the timing error estimator 42 sends an "add 1" signal to the counter 52, thereby shortening the time when the sampling switch reaches its No. 4 position during this transition. Thus the No. 4 sample count is reached in only three intervals instead of the usual four during this corrective cycle (FIG. 4). In the following cycle, when modulo-4 counting is restored, the No. 2 sampling time will now occur about 0.9T earlier than the pulse peak, bringing the timing error E within the range where correction can be effected in the normal manner, as shown in FIG. 2.

While the invention has been particularly shown and described with reference to preferred embodiments thereof, it will be understood by those skilled in the art that various changes in form and details may be made therein without departing from the spirit and scope of the invention.

What is claimed is:

1. An improved method of operating a pulse amplitude modulated data receiver which is implemented at least in part by a digital data processor whereby said receiver is able to receive pulse amplitude modulated data signals from a plurality of channels through a common path including an autonomously timed sampling commutator and an analog-to-digital converter, said method comprising the steps of:

a. operating said commutator at a frequency such that it samples the signals in each channel at a rate which is multiple of the nominal rate at which amplitude modulated data pulses are sent through that channel; b. establishing for each sampled pulse a repetitive sequence of regularly timed counting intervals, each having a duration T, the number of such intervals in each repetition of said sequence corresponding to the number of times that each pulse is sampled by said commutator;

c. from the set of digital codes produced by said converter in response to the sampling of each pulse by said commutator, determining the timing error, if any, between the instant when said pulse reaches its peak and the time at which a predetermined count in said sequence is reached;

d. in response to the determined value of said timing error and the digital codes representing the sampled pulse values, operating said processor in a manner such as to provide at least one digital filter for sequentially generating digital codes to represent the magnitude-versus-time function of each sampled pulse, said filter being so constituted that it causes the production of the digital code representing the peak value of each pulse to occur a selected number of counting intervals in said sequence subsequent to said predetermined count therein;

e. establishing a second repetitive sequence of regularly timed counting intervals corresponding in general to the first-mentioned sequence of counting intervals;

f. making available at the output of said receiver the digital code produced by said filter each time a particular count in said second sequence is attained; and g. effecting a coincidence between the time at which said particular count is attained and the time at which said filter produces a peak-value-representing code by optionally adjusting the number of intervals in said second sequence at which said particular count will occur and/or adjusting the whole or fractional number of intervals in said first sequence which will elapse between the actual occurrence of said pulse peak and the subsequent production of a peak-value-representing code by said filter.

2. A receiver operating method as set forth in claim 1 wherein Step d provides a digital filter which performs an interpolation among the coded sample values representing each pulse to ascertain the code representing the peak value of that pulse, and which delays the exit of said peak value code from said filter to coincide with the occurrence of said particular count.

3. A method as set forth in claim 2 wherein said processor is preconditioned to store various filter coefficients that may be utilized selectively in Step d to provide the digital filter with a chosen delay period L whose value lies between certain minimum and maximum values according to the amount of delay chosen.

4. A method as set forth in claim 3 in which Step d provides a digital filter having an output/input function F(z) defined by the following equation:

$$F(z) = (A_2 + A_1z^{-1} + z^{-2})/(1 + A_1z^{-1} + A_2z^{-2})$$

wherein $z^{-k}$ represents a time delay of $kT$, and $A_1$ and $A_2$ are filter coefficients whose values are related to the chosen value of the delay period L.

5. A method as set forth in claim 3 in which Step d provides a filter having an output/input function $F(z)$ defined by the following equation:

$$F(z) = (p_1 - z^{-1})/(1 - p_1z^{-1}) \cdot (p_2 - z^{-1})/(1 - p_2z^{-1})$$

wherein $z^{-k}$ represents a time delay of $kT$, and $p_1$ and $p_2$ are filter coefficients whose values are related to the chosen value of the delay period L.

6. A method as set forth in claim 3 which includes the steps of detecting when the timing error that is determined in Step C is outside a given range of values, and in response thereto temporarily altering the number of intervals in said second sequence at which said particular count will occur as specified in step f, so that the resulting delay L may be chosen by the selection of available stored filter coefficients.

7. A method as set forth in claim 3 wherein Step d provides a pair of filters, one of which is supplied with coefficients that are currently in use, and the other of which is supplied with coefficients that next will be needed when the timing error reaches such magnitude that a change in the value of the delay L is needed, the determination as to which filter shall supply the receiver output being made during Step d in response to the determination of the timing error in Step c.

8. In a digital data receiver for receiving pulse amplitude modulated data signals from a plurality of channels, an improved timing control means for enabling such signals to be received through an analog-to digital converter which is common to all of said channels, notwithstanding any lack of mutual synchronism among the several channels, said improvement comprising:

a. an imput sampling commutator, whose timing is autonomous with respect to the pulse timing in said channels, interposed between said channels and said converter, said commutator being operable to sample each of the channels at a rate which is a multiple of the pulse frequency in that channel, whereby each sample pulse is represented at the output of said converter by a sequence of digital codes corresponding to the respective sample values;

b. a sample counter for maintaining a modular count of the time intervals at which said digital codes are produced by said converter for any given channel, the modulus of such count being the number of samples per pulse;

c. a timing error estimator responsive to the digital codes representing the respective sample values for determining the timing error, if any, between the instant when each sampled pulse is at its peak and the time when the sample count for that pulse reached a predetermined value less than said modulus;

d. digital filter means effective in response to the sequence of digital codes from said converter which represents each pulse in said given channel to generate a series of output digital codes representing the magnitude-versus-time function of that pulse, including the peak value thereof, said filter means delaying the production of the output code representing said peak value for a period of time determined by the characteristics of said filter means, said timing error estimator controlling the characteristics of said filter means and said sample counter to effect a coincidence between the time at which said filter means produces a peak-value-representing code and the time at which said sample counter attains a particular count subsequent to said predetermined count by optionally adjusting the count number being maintained by said sample counter and/or the delay period effected by said filter means; and e. an output sampling switch controlled by said counter for delivering to the output of said receiver in said given channel the digital codes which are produced by said filter means at the times when said sample counter reaches said particular count, thereby effectively correcting any initial errors in pulse timing.

9. Timing control means as set forth in claim 8 wherein the duration of the peak delay period effected by said filter means depends upon the values of certain coefficients chosen for said filter means, said control means including selector means responsive to the output of said timing error estimator for selecting from among the available sets of filter coefficients those which will provide the required delay period.

10. Timing control means as set forth in claim 9 wherein said timing error estimator has a controlling relationship to said sample counter for altering the count maintained by said counter when the timing error assumes a value such that it would fall outside the range for which correction could be made by the available filter coefficients in the absence of such count alteration, thereby changing the length of the delay period which must be provided by said filter means so that it can be attained through the selection of available filter coefficients.

11. Timing control means as set forth in claim 9 wherein said digital filter means includes a pair of filters having different coefficients, only one of said filters having its output coupled to said output sampling switch at any given time, said control means including a filter status switch controlled by said selector means for determining which of said filters should be coupled to said switch whenever a change of coefficients is required, said selector means then being effective to supply the other filter with the coefficients which most probably will be needed when the next change of coefficients occurs.

* * * * *